(12) United States Patent
Michels et al.

(10) Patent No.: US 11,319,904 B2
(45) Date of Patent: *May 3, 2022

(54) SUPPLY OF AN ACTIVE PRECHAMBER FOR TURBOCHARGED GASOLINE ENGINES WITH AN AIR EXTRACTION DOWNSTREAM OF AN EXHAUST GAS TURBOCHARGER

(71) Applicant: Volkswagen Aktiengesellschaft, Wolfsburg (DE)

(72) Inventors: Karsten Michels, Magdeburg (DE); Dirk Hagelstein, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,142

(22) Filed: Oct. 19, 2020

(65) Prior Publication Data
US 2021/0115880 A1    Apr. 22, 2021

(30) Foreign Application Priority Data

Oct. 17, 2019 (DE) ..................... 10 2019 128 111.3

(51) Int. Cl.
| | | |
|---|---|---|
| F02B 19/10 | (2006.01) |
| F02M 26/06 | (2016.01) |
| F02M 26/08 | (2016.01) |
| F02B 19/00 | (2006.01) |

(52) U.S. Cl.
CPC ............ *F02M 26/06* (2016.02); *F02B 19/00* (2013.01); *F02M 26/08* (2016.02)

(58) Field of Classification Search
CPC ......... F02B 19/12; F02B 19/00; F02M 26/20; F02M 26/06; F02M 26/08
See application file for complete search history.

(56) References Cited

U.S. PATENT DOCUMENTS

| | | | |
|---|---|---|---|
| 9,644,571 B2* | 5/2017 | Gruber | ............... F02M 21/0227 |
| 11,002,177 B2* | 5/2021 | Singh | .................. F02D 13/0276 |
| 2013/0055985 A1 | 3/2013 | Gruber et al. | |

(Continued)

FOREIGN PATENT DOCUMENTS

| | | |
|---|---|---|
| AT | 12 203 U1 | 3/2012 |
| AT | 13 417 U1 | 12/2013 |

(Continued)

*Primary Examiner* — Gonzalo Laguarda
(74) *Attorney, Agent, or Firm* — Muncy, Geissler, Olds & Lowe, P.C.

(57) ABSTRACT

An internal combustion engine having at least one cylinder that has a main combustion chamber for burning a fuel/air mixture or a fuel/air/exhaust gas mixture and has a flushed prechamber connected to the main combustion chamber via at least one overflow duct on the fluid side. At least one exhaust gas turbocharger is provided that has a turbine for the expansion of the at exhaust gas leaving the at least one cylinder and a compressor for compressing fresh air or a fresh air/exhaust gas mixture to be supplied to the at least one cylinder as compressed charge-air. In a charge-air line downstream of the compressor, an extraction point is formed from which a flushing line branches off, via which a partial amount of charge-air of the compressed charge-air for flushing the at least one prechamber can be extracted.

11 Claims, 1 Drawing Sheet

(56) References Cited

U.S. PATENT DOCUMENTS

2018/0363539 A1\* 12/2018 Shelby .................. F02B 19/108
2020/0200068 A1\* 6/2020 Schock ................... F02B 21/02
2021/0115840 A1\* 4/2021 Michels .............. F02B 19/1023

FOREIGN PATENT DOCUMENTS

| DE | 10 2015 004 741 A1 | 10/2016 |
| DE | 10 2015 210 669 A1 | 12/2016 |
| DE | 10 2015 221 286 A1 | 5/2017 |
| DE | 10 2016 112 537 A1 | 1/2018 |
| EP | 2 948 667 B1 | 7/2017 |
| WO | WO 2014/114848 A1 | 7/2014 |

\* cited by examiner

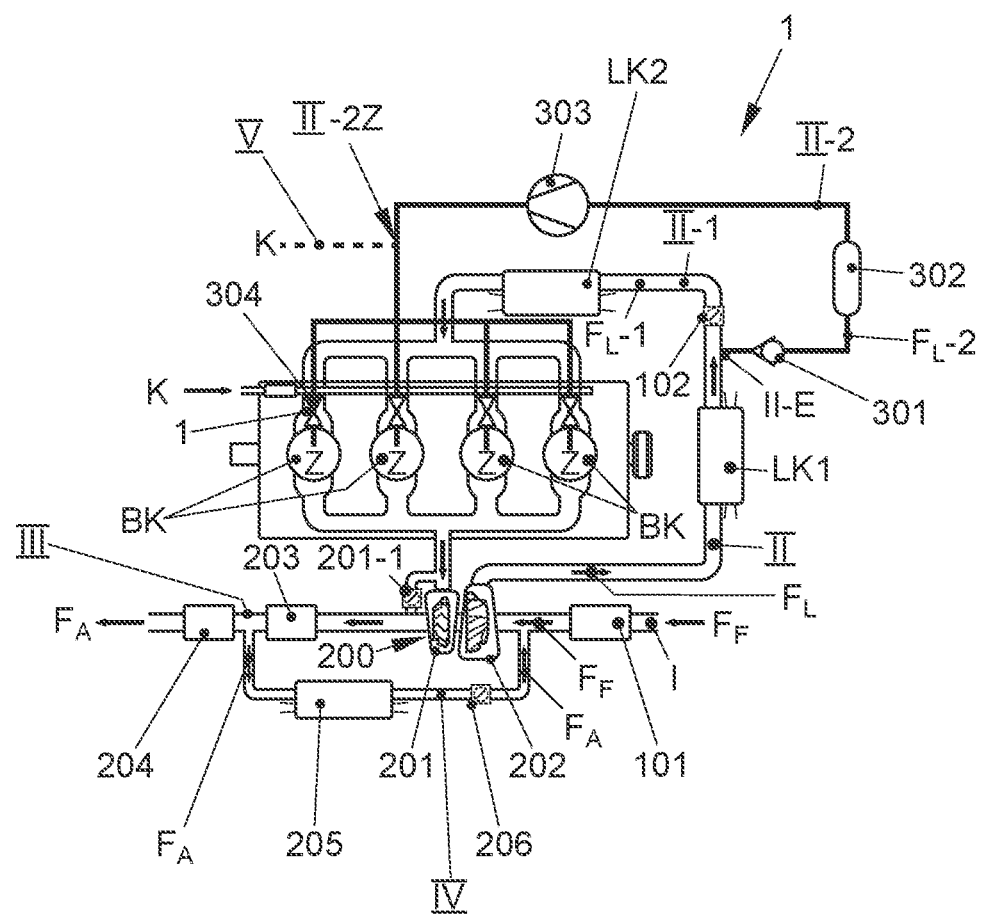

SUPPLY OF AN ACTIVE PRECHAMBER FOR TURBOCHARGED GASOLINE ENGINES WITH AN AIR EXTRACTION DOWNSTREAM OF AN EXHAUST GAS TURBOCHARGER

This nonprovisional application claims priority under 35 U.S.C. § 119(a) to German Patent Application No. 10 2019 128 111.3, which was filed in Germany on Oct. 17, 2019, and which is herein incorporated by reference.

BACKGROUND OF THE INVENTION

Field of the Invention

The present invention relates to an internal combustion engine, comprising at least one cylinder, wherein the at least one cylinder has a main combustion chamber for combustion of a fuel/air mixture or a fuel/air/exhaust gas mixture and a flushed prechamber connected to the main combustion chamber on the fluid side via at least one overflow duct and an exhaust gas turbocharger.

Description of the Background Art

EP 2 948 667 B1 describes a method for operating a multicylinder piston engine. It is provided that in the engine, each cylinder has a reciprocating piston and a pre-combustion chamber, and the method comprises the steps of introducing gaseous fuel in an intake duct of the engine, injecting liquid pilot fuel into the pre-combustion chamber, igniting the liquid pilot fuel by means of compression by the piston and utilizing the combustion of the liquid pilot fuel to ignite the gaseous fuel, wherein the exhaust gas is introduced in the pre-combustion chamber prior to the injection of the liquid pilot fuel. In this method, the exhaust gas is cooled before it is introduced in the pre-combustion chamber, and the intake air is mixed with the exhaust gas before the mixture of the exhaust gas and the intake air is introduced into the pre-combustion chamber.

Another gasoline engine and an associated method of the generic type for supplying a main combustion chamber with compressed combustion air and a prechamber with a fuel/air mixture is known from the document DE 10 2016 112 537 A1. It is provided here that the gasoline engine comprises at least one cylinder, wherein the at least one cylinder includes a main combustion chamber for burning a fuel gas-air mixture and a flushed prechamber which is coupled to the main combustion chamber via an overflow passage. The gasoline engine further comprises at least one exhaust gas turbocharger which has a turbine for the expansion of the exhaust gas leaving the at least one cylinder and a compressor for compressing the air to be supplied to the at least one cylinder, wherein a plurality of air paths are provided for the at least one cylinder to be supplied with air, wherein via a first air path at least compressible air can be supplied by a first compressor to the main combustion chamber of the at least one cylinder and wherein via a second air path, compressible air can be supplied by a second compressor to the prechamber of at least each cylinder.

SUMMARY OF THE INVENTION

It is therefore an object of the present invention to provide a novel generic gasoline engine and a new method for the operation of the gasoline engine.

This object is achieved by an Otto-cycle internal combustion engine and a corresponding method of operation of the internal combustion engine.

Provided, in an exemplary embodiment, is an internal combustion engine, comprising at least one cylinder, wherein the at least one cylinder has a main combustion chamber for combustion of a fuel/air mixture or a fuel/air/exhaust gas mixture and a flushed prechamber connected on the fluid side to the main combustion chamber via at least one overflow duct, and at least one exhaust gas turbocharger, which has a turbine for the expansion of the exhaust gas leaving the at least one cylinder and a compressor for compressing the fresh air or a fresh air/exhaust gas mixture to be supplied by the at least one cylinder as compressed charge-air.

According to the invention it is provided that an extraction point is formed in a charge-air line downstream of the compressor, from which a flushing line branches off, via which a partial amount of the compressed charge-air can be extracted for flushing from the at least one prechamber, wherein a supplementary compressor is arranged in the flushing line that increases the boost pressure of the compressed charge-air as required.

A first intercooler can be arranged in the charge-air line downstream of the compressor upstream of the extraction point.

The extraction point can be arranged between the first intercooler and a throttle valve of an intake manifold leading to the at least one main combustion chamber.

A check valve or a check valve and a buffer tank can be arranged upstream of the supplementary compressor in the flushing line.

According to the invention, it is preferably further provided that a feed point of a fuel feed line for supplying fuel to the charge-air, which is recompressed by means of the supplementary compressor and which is present in the flushing line as fresh air or as a fresh air/exhaust gas mixture, is formed in the flushing line downstream of the supplementary compressor.

Fresh air can be supplied to the compressor from a fresh air line disposed upstream so that fresh air can be extracted as compressed charge-air via the extraction point and can be recompressed in the flushing line by means of the supplementary compressor as required.

A fresh air/exhaust gas mixture can be supplied to the compressor from a fresh air line arranged upstream in that the fresh air line is connected upstream of the compressor with an exhaust gas recirculation line of an exhaust line. As a result, exhaust gas can be supplied to the fresh air in the fresh air line, so that the fresh air/exhaust gas mixture can be extracted via the extraction point as charge-air compressed by the exhaust gas turbocharger, and the fresh air/exhaust gas mixture can be recompressed in the flushing line by means of the supplementary compressor as required.

The method according to the invention for operating an internal combustion engine is characterized in that the internal combustion engine comprises at least one cylinder, wherein the at least one cylinder has a main combustion chamber for combustion of a fuel/air mixture or a fuel/air/exhaust gas mixture and has a flushed prechamber which is connected on the fluid side with the main combustion chamber via at least one overflow duct, wherein the internal combustion engine further comprises at least one exhaust gas turbocharger, which has a turbine for the expansion of the exhaust gas leaving the at least one cylinder and a compressor for compressing fresh air or a fresh air/exhaust gas mixture to be supplied to the at least one cylinder as compressed charge-air, wherein in accordance with the invention, the method is characterized in that an extraction point from which a flushing line branches off is formed in a charge-air line downstream of the compressor, via which flushing line a partial amount of charge-air compressed in the compressor of the turbocharger is extracted for flushing at least one prechamber, wherein in the flushing line a supplementary compressor is arranged to boost the pressure of the compressed charge-air as required so that the at least one prechamber is flushed with recompressed fresh air or a recompressed fresh air/exhaust gas mixture.

Further, it is possible by the structural design of the internal combustion engine that the compressed charge-air, in particular the fresh air or the fresh air/exhaust gas mixture downstream of the supplementary compressor, can be supplied with fuel as required so that the at least one prechamber can be flushed with a recompressed fuel/fresh air mixture or a recompressed fuel/air/exhaust gas mixture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE is a schematic representation of an internal combustion engine, in particular a gasoline engine according to the invention, with an air supply to an active prechamber for turbocharged gasoline engines with air extraction downstream of an exhaust gas turbocharger.

DETAILED DESCRIPTION

The FIGURE shows a diagram of the gasoline engine 1 according to the invention, which comprises several cylinders Z. Each of the cylinders Z has a main combustion chamber BK and a prechamber (not explicitly shown), wherein the respective prechamber is coupled to the main combustion chamber BK of the respective cylinder Z via at least one overflow duct (not shown).

In the cylinders Z of the gasoline engine 1, namely in the area of the main combustion chambers BK of the cylinders Z, a mixture of fuel gas and air is burned, wherein the resulting exhaust gas $F_A$ is vented via an exhaust gas turbocharger 200, in particular via a turbine 201 of the exhaust gas turbocharger 200, and, in the exemplary embodiment, in an exhaust gas line III via catalytic converters, in particular a precatalytic converter 203 and a main catalytic converter 204. Energy obtained in this way in the region of the turbine 201 of the turbocharger 200 is used for compressing combustion air/fresh air $F_F$ in a compressor 202, which is then supplied to the cylinders Z of the gasoline engine 1 in a charge-air line II as compressed combustion air $F_L$ or charge-air.

In the illustrated exemplary embodiment, the simplest form of boost pressure control by means of a turbine-side bypass is shown with a boost pressure control flap 201-1.

The exemplary embodiment relates to a gasoline engine 1 with a spark-ignited internal mixture formation, that is, the fuel/air mixture is formed by direct injection of liquid fuel or injection of gaseous fuel via injectors/injection valves (not shown) in the main combustion chamber BK and ignited by means of an ignition device (not shown). The described method may also be used analogously in an external mixture formation. This means, the illustration and the subsequent description are provided based on one of several embodiments of the mixture formation.

In the exemplary embodiment, an exhaust gas recirculation line IV is formed upstream of the turbine 201, which in the conventional manner comprises an exhaust gas recirculation cooler 205 and an exhaust gas recirculation flap 206, wherein the exhaust gas $F_A$ is incorporated in the fresh air line I downstream of an air filter 101 of the fresh air line I, upstream of the compressor 202.

According to the invention, the gasoline engine 1 has two partial charge-air lines II-1 and II-2, via which charge-air $F_L$-1 and $F_L$-2 is supplied to the main combustion chambers BK and the prechambers, see FIG. 1, which are formed downstream of the compressor 202, starting from the common charge-air line II, which will be discussed below.

Starting from the common charge-air line II, the first partial charge-air line II-1 supplies compressed charge-air $F_L$-1 from the compressor 202 to the main combustion chambers BK of the respective cylinders Z.

Starting from the common charge-air line II, the second partial charge-air line II-2 provides compressed charge-air $F_L$-2 from the compressor 202 to the prechambers of the respective cylinders Z.

In other words, the charge-air line II has an extraction point II-E (upstream of the throttle valve 102), at which compressed charge-air $F_L$ is extracted as flushing air for the prechambers of the respective cylinders Z with the boost pressure present upstream of the throttle valve 102, which is why the second partial charge-air line II-2 forms the flushing line for the prechambers and the partial charge-air line II-1 for the main combustion chambers BK.

Downstream of the extraction point II-E, a check valve 301, preferably a buffer tank 302 and a supplementary compressor 303 are assigned to the flushing line II-2 and after appropriate division of the flushing line II-2 into individual flushing air lines, timing valves 304 are assigned to each cylinder Z via which at predefined times a predefined amount of flushing air $F_L$-2 is fed to the prechambers of the respective cylinder Z via the flushing line.

According to the invention, it is also provided that not only flushing air $F_L$-2, but alternatively an air-fuel vapor mixture is provided for flushing the prechambers of the respective cylinders Z, so that the second partial charge-air line II-2, which can also be referred to as a flushing line II-2, feeds fuel K to the flushing line II-2 at a feed point II-2 Z via a fuel supply line V, which, prior to dividing the flushing line II-2 into the individual flushing air conduits is arranged upstream of the timing valves 304 downstream of the supplementary compressor 303.

If an air-fuel vapor mixture $F_L$-2/K is present, a predefined amount of air-fuel vapor mixture $F_L$-2/K can accordingly be supplied at predefined times as a flushing medium via the flushing line II-2 to the prechambers of the respective cylinders Z.

According to the invention, a pressure level above the charge-air pressure of the charge-air $F_L$-1 is required for flushing the active prechambers with charge-air $F_L$-2 or with the charge-air-fuel mixture $F_L$-2/K for the flushing medium to be injected.

It is therefore proposed that the supplementary compressor 303 arranged according to the invention raises the pressure level of the charge-air $F_L$ in the flushing line II-2 to a predefined flushing air pressure, which is preferably up to twice the pressure of the charge-air $F_L$.

In other words, the flushing pressure generated by the supplementary compressor 303 is always above the pressure present in the prechamber. A demand-dependent pressure is generated by means of the supplementary compressor 303, the pressure level of which is above the prechamber pressure, so that when the respective timing valve 304 is opened reliable flushing of the prechamber 13 in the direction of the main combustion chamber BK is always guaranteed. The pressure downstream of the supplementary compressor 303 is thus always greater than the pressure of the compressor 202 of the exhaust gas turbocharger 200. The compressors 202 and 303 are configured accordingly and operated in accordance with the explanations.

In an advantageous manner, due to the removal of the charge-air $F_L$ from the charge-air line II, the output pressure for the supplementary compressor 303 in charged operation is above the ambient pressure, so that there is less compression work for the supplementary compressor 303. In other words, starting from the applied charge-air pressure of the charge-air $F_L$ at the extraction point II-E, the supplementary compressor 303 delivers its compression efficiency as a pressure increase, which depends on the required or predefined flushing air at the timing valves 30.

It is preferably provided that the charge-air $F_L$ is extracted downstream of an intercooler LK1. In the present embodiment, a first intercooler LK1 is arranged in the common charge-air line II, and downstream of the throttle valve 102 a further intercooler LK2 is arranged in the partial charge-air line II-1 leading to the main combustion chambers BK.

Advantageously, the extraction of the charge-air $F_L$ downstream of an intercooler LK1 results in a somewhat lower output pressure at the extraction point II-E than upstream of the intercooler LK1. However, the cooler flushing air $F_L$-2 not only contains more oxygen, it also has a lower volume, whereby on the one hand the supplementary compressor 303 advantageously has to perform less compression work, wherein on the other hand, despite the supplementary compression downstream, the charge-air or the charge-air/fuel mixture $F_L$-2/K for flushing the prechambers is advantageously easier to ignite by means of the supplementary compressor 303 due to the oxygen that is more readily available at the extraction point II-E.

In an alternative embodiment, the fresh air $F_F$ in the fresh air line I can be supplied with exhaust gas via the exhaust gas recirculation flap 206, so that exhaust gas can be supplied to the fresh air $F_F$.

In this case, a fresh air/exhaust gas mixture $F_F/F_A$ is conducted via the charge-air line II at a predefined mixture ratio, which is guided to the main combustion chambers BK and to the prechambers and, as previously discussed, is compressed via the compressor 202 and is recompressed to the prechambers in the flushing line II-2, wherein a predefined amount of fuel K is supplied to the fresh air/exhaust gas mixture $F_F/F_A$ via the fuel supply line V at the feed point II-2Z, so that finally a recompressed fuel/air/exhaust gas mixture $K/F_F/F_A$ can be guided into the prechambers by means of the supplementary compressor 303.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An internal combustion engine comprising:
at least one cylinder having a main combustion chamber for a combustion of a fuel/air mixture or a fuel/air/exhaust gas mixture and a prechamber connected with the main combustion chamber on a fluid side via at least one overflow duct;
at least one exhaust gas turbocharger comprising a turbine for an expansion of exhaust gas leaving the at least one cylinder and a compressor for compressing fresh air or a fresh air/exhaust mixture into a compressed charge-air to be supplied to the at least one cylinder;
an extraction point formed in a charge-air line downstream of the compressor from which a flushing line branches off, via which a partial amount of the compressed charge-air is extracted for flushing the prechamber; and
a supplementary compressor arranged in the flushing line to increase a boost pressure of the compressed charge-air as required,
wherein, in the flushing line downstream of the supplementary compressor, a feed point of a fuel supply line is formed for supplying fuel to the compressed charge-air.

2. The internal combustion engine according to claim 1, wherein a first intercooler is arranged in the charge-air line downstream of the compressor and upstream of the extraction point.

3. The internal combustion engine according to claim 2, wherein the extraction point is arranged between the first intercooler and a throttle valve of an intake manifold leading to the main combustion chamber.

4. The internal combustion engine according to claim 2, wherein at the extraction point, a second line branches off from the charge-air line to supply another partial amount of the compressed charge-air to the main combustion chamber, wherein a second intercooler is disposed in the second line between the extraction point and the main combustion chamber.

5. The internal combustion engine according to claim 1, wherein a check valve or a check valve and a buffer tank is/are disposed in the flushing line upstream of the supplementary compressor.

6. The internal combustion engine according to claim 1, wherein the compressor is supplied the fresh air from a fresh air line arranged upstream of the compressor, such that the fresh air is extracted as the compressed charge-air via the extraction point and recompressed as required in the flushing line via the supplementary compressor.

7. The internal combustion engine according to claim 1, wherein a fresh air line is connected to an exhaust gas recirculation line of an exhaust gas line upstream of the compressor to supply the exhaust gas to the fresh air in the fresh air line, so that a fresh air/exhaust gas mixture is fed to the compressor and then the fresh air/exhaust gas mixture is extracted as the compressed charge-air via the extraction point and recompressed as required in the flushing line via the supplementary compressor.

8. The internal combustion engine according to claim 7, wherein the turbine is provided in the exhaust gas line and wherein the exhaust gas recirculation line branches off from the exhaust gas line at a point that is downstream of the turbine.

9. The internal combustion engine according to claim 8, wherein an exhaust gas recirculation cooler is provided in the exhaust gas recirculation line.

10. A method for operating an internal combustion engine, the method comprising:
- providing at least one cylinder, wherein the at least one cylinder has a main combustion chamber for burning a fuel/air mixture or a fuel/air/exhaust gas mixture and has a prechamber connected on the fluid side to the main combustion chamber via at least one overflow duct;
- providing at least one exhaust gas turbocharger with a turbine for the expansion of an exhaust gas leaving the at least one cylinder; and
- providing a compressor for compressing fresh air or a fresh air/exhaust gas mixture into a compressed charge-air to be supplied to the at least one cylinder,
- forming an extraction point in a charge-air line downstream of the compressor from which a flushing line branches off, via which a partial amount of the compressed charge-air is extracted for flushing the prechamber;
- arranging a supplementary compressor in the flushing line that increases a boost pressure of the compressed charge-air as required such that the prechamber is flushed with recompressed fresh air or a recompressed fresh air/exhaust gas mixture,
- wherein the recompressed fresh air or the recompressed fresh air/exhaust gas mixture in the flushing line is fed fuel downstream of the supplementary compressor such that the-prechamber is flushed with a fuel/recompressed fresh air mixture or a fuel/recompressed fresh air/exhaust gas mixture.

11. The method according to claim 10, wherein a first intercooler is arranged in the charge-air line downstream of the compressor and upstream of the extraction point, and wherein at the extraction point, a second line branches off from the charge-air line to supply another partial amount of the compressed charge-air to the main combustion chamber, wherein a second intercooler is disposed in the second line between the extraction point and the main combustion chamber.

* * * * *